United States Patent
Takahashi et al.

(10) Patent No.: US 11,375,465 B2
(45) Date of Patent: *Jun. 28, 2022

(54) USER EQUIPMENT

(71) Applicant: NTT DOCOMO, INC., Tokyo (JP)

(72) Inventors: Hideaki Takahashi, Tokyo (JP); Hiroki Harada, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/040,179

(22) PCT Filed: Apr. 10, 2019

(86) PCT No.: PCT/JP2019/015663
§ 371 (c)(1),
(2) Date: Sep. 22, 2020

(87) PCT Pub. No.: WO2019/203093
PCT Pub. Date: Oct. 24, 2019

(65) Prior Publication Data
US 2021/0014808 A1    Jan. 14, 2021

(30) Foreign Application Priority Data
Apr. 17, 2018 (JP) .............................. JP2018-079103

(51) Int. Cl.
*H04W 56/00* (2009.01)
*H04W 72/04* (2009.01)
*H04W 88/02* (2009.01)

(52) U.S. Cl.
CPC ....... *H04W 56/001* (2013.01); *H04W 72/042* (2013.01); *H04W 88/02* (2013.01)

(58) Field of Classification Search
CPC . H04W 56/001; H04W 72/042; H04W 88/02; H04W 48/12; H04W 48/16; H04W 48/10; H04W 56/00
See application file for complete search history.

(56) References Cited

U.S. PATENT DOCUMENTS

2016/0330703 A1* 11/2016 Shim .................... H04W 56/001

FOREIGN PATENT DOCUMENTS

| EP | 3780798 A1 | 2/2021 |
|---|---|---|
| EP | 3783968 A1 | 2/2021 |

OTHER PUBLICATIONS

International Search Report issued in PCT/JP2019/015663 dated Jul. 16, 2019 (3 pages).

(Continued)

*Primary Examiner* — Kabir A Timory
(74) *Attorney, Agent, or Firm* — Osha Bergman Watanabe & Burton LLP

(57) ABSTRACT

In one aspect of the present invention, user equipment includes a reception unit configured to receive first system information in a frequency block where a synchronization signal is placed and third system information in another frequency block; and a control unit configured to stop detecting the synchronization signal, (1) based on a parameter value determined from the first system information, (1-1) when a control channel search space for receiving second system information does not exist and (1-2) when the parameter value is within a predetermined range and (2) when the control channel search space for receiving the second system information does not exist based on a parameter value determined from the third system information.

13 Claims, 20 Drawing Sheets

(56) References Cited

OTHER PUBLICATIONS

Written Opinion of the International Searching Authority issued in PCT/JP2019/015663 dated Jul. 16, 2019 (4 pages).
Ericsson; "Security threats in MIB"; 3GPP TSG-RAN WG2 #101bis, Tdoc R2-1805699; Sanya, China; Apr. 16-20, 2018 (6 pages).
3GPP TS 38.211 V2.0.0; "3rd Generation Partnership Project; Technical Specification Group Radio Access Network NR; Physical channels and modulation (Release 15)" Dec. 2017 (73 pages).
3GPP TS 38.213 V2.0.0; "3rd Generation Partnership Project; Technical Specification Group Radio Access Network NR; Physical layer procedures for control (Release 15)" Dec. 2017 (56 pages).
3GPP TSG RAN WG1 Meeting #92bis; R1-1805032 "Remaining issues on NR-PBCH" NTT Docomo, Inc.; Sanya, China; Apr. 16-20, 2018 (4 pages).
Extended European Search Report issued in European Application No. 19788603.9, dated Dec. 17, 2021 (12 pages).

* cited by examiner

FIG.4

| $k_{SSB}$ | RMSI-PDCCH-Config | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ..., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ..., -768 |
| 30 | 0, 1, ..., 255 | Reserved, Reserved, ..., Reserved |

FIG.5

| $k_{SSB}$ | RMSI-PDCCH-Config | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.6

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. <u>If a UE detects the second SS/PBCH block at $N_{GSCN}^{Reference} + N_{GSCN}^{Offset}$ according to the indication in the first SS/PBCH block and determines that a control resource set for Type0-PDCCH common search space is not present as specified in sub-clause 4.1, the UE shall no longer attempt to detect the second SS/PBCH block at $N_{GSCN}^{Reference} + N_{GSCN}^{Offset}$ and the first SS/PBCH block (identified by PCI and GSCN) until the UE completes to scan all SS rasters outside the GSCN range in the supported NR frequency bands.</u>

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

Table 13-16: Mapping between the combination of $k_{SSB}$ and *RMSI-PDCCH-Config* to $N_{GSCN}^{Offset}$ for FR1

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

Table 13-17: Mapping between the combination of $k_{SSB}$ and *RMSI-PDCCH-Config* to $N_{GSCN}^{Offset}$ for FR2

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.7

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. If a UE detects the second SS/PBCH block at $N_{GSCN}^{Reference} + N_{GSCN}^{Offset}$ according to the indication in the first SS/PBCH block and determines that a control resource set for Type0-PDCCH common search space is not present as specified in sub-clause 4.1 and the second SS/PBCH block indicates the GSCN by $N_{GSCN}^{Reference} + N_{GSCN}^{Offset}$ where the first SS/PBCH is present, the UE shall no longer attempt to detect the second SS/PBCH block at $N_{GSCN}^{Reference} + N_{GSCN}^{Offset}$ and the first SS/PBCH block (identified by PCI and GSCN) until the UE completes to scan all SS rasters outside the GSCN range in the supported NR frequency bands.

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

Table 13-16: Mapping between the combination of $k_{SSB}$ and *RMSI-PDCCH-Config* to $N_{GSCN}^{Offset}$ for FR1

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ..., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ..., -768 |
| 30 | 0, 1, ..., 255 | Reserved, Reserved, ..., Reserved |

Table 13-17: Mapping between the combination of $k_{SSB}$ and *RMSI-PDCCH-Config* to $N_{GSCN}^{Offset}$ for FR2

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.8

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. If a UE detects the second SS/PBCH block at $N_{GSCN}^{Reference} + N_{GSCN}^{Offset}$ according to the indication in the first SS/PBCH block and determines that a control resource set for Type0-PDCCH common search space is not present as specified in sub-clause 4.1, the UE shall no longer attempt to detect the second SS/PBCH block at $N_{GSCN}^{Reference} + N_{GSCN}^{Offset}$ and the first SS/PBCH block (identified by PCI and GSCN) until the UE completes to scan all SS rastes outside the GSCN range in this NR frequency band.

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

Table 13-16: Mapping between the combination of $k_{SSB}$ and RMSI-PDCCH-Config to $N_{GSCN}^{Offset}$ for FR1

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

Table 13-17: Mapping between the combination of $k_{SSB}$ and RMSI-PDCCH-Config to $N_{GSCN}^{Offset}$ for FR2

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.9

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. If a UE detects the second SS/PBCH block at $N_{GSCN}^{Reference} + N_{GSCN}^{Offset}$ according to the indication in the first SS/PBCH block and determines that a control resource set for Type0-PDCCH common search space is not present as specified in sub-clause 4.1 and the second SS/PBCH block indicates the GSCN by $N_{GSCN}^{Reference} + N_{GSCN}^{Offset}$ where the first SS/PBCH is present, the UE shall no longer attempt to detect the second SS/PBCH block at $N_{GSCN}^{Reference} + N_{GSCN}^{Offset}$ and the first SS/PBCH block (identified by PCI and GSCN) until the UE completes to scan all SS rastes outside the GSCN range in this NR frequency band.

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

Table 13-16: Mapping between the combination of $k_{SSB}$ and *RMSI-PDCCH-Config* to $N_{GSCN}^{Offset}$ for FR1

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ..., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ..., -768 |
| 30 | 0, 1, ..., 255 | Reserved, Reserved, ..., Reserved |

Table 13-17: Mapping between the combination of $k_{SSB}$ and *RMSI-PDCCH-Config* to $N_{GSCN}^{Offset}$ for FR2

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.10

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. If a UE detects the second SS/PBCH block at $N_{GSCN}^{Reference} + N_{GSCN}^{Offset}$ according to the indication in the first SS/PBCH block and determines that a control resource set for Type0-PDCCH common search space is not present as specified in sub-clause 4.1, the UE shall no longer attempt to detect the second SS/PBCH block at $N_{GSCN}^{Reference} + N_{GSCN}^{Offset}$ and the first SS/PBCH block (identified by PCI and GSCN) for XXX (e.g. 300) seconds.

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

Table 13-16: Mapping between the combination of $k_{SSB}$ and *RMSI-PDCCH-Config* to $N_{GSCN}^{Offset}$ for FR1

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

Table 13-17: Mapping between the combination of $k_{SSB}$ and *RMSI-PDCCH-Config* to $N_{GSCN}^{Offset}$ for FR2

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.11

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. <u>If a UE detects the second SS/PBCH block at $N_{GSCN}^{Reference} + N_{GSCN}^{Offset}$ according to the indication in the first SS/PBCH block and determines that a control resource set for Type0-PDCCH common search space is not present as specified in sub-clause 4.1 and the second SS/PBCH block indicates the GSCN by $N_{GSCN}^{Reference} + N_{GSCN}^{Offset}$ where the first SS/PBCH is present, the UE shall no longer attempt to detect the second SS/PBCH block at $N_{GSCN}^{Reference} + N_{GSCN}^{Offset}$ and the first SS/PBCH block (identified by PCI and GSCN) for XXX (e.g. 300) seconds.</u>

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

**Table 13-16: Mapping between the combination of $k_{SSB}$ and *RMSI-PDCCH-Config* to $N_{GSCN}^{Offset}$ for FR1**

| $k_{SSB}$ | *RMSI-PDCCH-Config* | $N_{GSCN}^{Offset}$ |
|---|---|---|
| 24 | 0, 1, …, 255 | 1, 2, …, 256 |
| 25 | 0, 1, …, 255 | 257, 258, …, 512 |
| 26 | 0, 1, …, 255 | 513, 514, …., 768 |
| 27 | 0, 1, …, 255 | -1, -2, …, -256 |
| 28 | 0, 1, …, 255 | -257, -258, …, -512 |
| 29 | 0, 1, …, 255 | -513, -514, …., -768 |
| 30 | 0, 1, …, 255 | Reserved, Reserved, …, Reserved |

**Table 13-17: Mapping between the combination of $k_{SSB}$ and *RMSI-PDCCH-Config* to $N_{GSCN}^{Offset}$ for FR2**

| $k_{SSB}$ | *RMSI-PDCCH-Config* | $N_{GSCN}^{Offset}$ |
|---|---|---|
| 12 | 0, 1, …, 255 | 1, 2, …, 256 |
| 13 | 0, 1, …, 255 | -1, -2, …, -256 |
| 14 | 0, 1, …, 255 | Reserved, Reserved, …, Reserved |

FIG.12

If a UE detects a first SS/PBCH block and determines that a control resource set for Type0-PDCCH common search space is not present, and for $24 \le k_{SSB} \le 30$ for FR1 or for $12 \le k_{SSB} \le 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. If a UE detects the second SS/PBCH block at $N_{GSCN}^{Reference} + N_{GSCN}^{Offset}$ according to the indication in first SS/PBCH block and determines that a control resource set for Type0-PDCCH common search space is not present as specified in sub-clause 4.1, the UE shall no longer attempt to detect a SS/PBCH block within the range between the first and the second SS/PBCH blocks (identified by PCI and GSCN) until the UE completes to scan all SS rasters outside the GSCN range in the supported NR frequency bands.

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

**Table 13-16: Mapping between the combination of $k_{SSB}$ and *RMSI-PDCCH-Config* to $N_{GSCN}^{Offset}$ for FR1**

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

**Table 13-17: Mapping between the combination of $k_{SSB}$ and *RMSI-PDCCH-Config* to $N_{GSCN}^{Offset}$ for FR2**

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.13

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. <u>If a UE detects the second SS/PBCH block at ~~withinat~~ $N_{GSCN}^{Reference} + N_{GSCN}^{Offset}$ according to the indication in first SS/PBCH block and determines that a control resource set for Type0-PDCCH common search space is not present as specified in sub-clause 4.1 and the second SS/PBCH block indicates the GSCN by $N_{GSCN}^{Reference} + N_{GSCN}^{Offset}$ where the first SS/PBCH is present, the UE shall no longer attempt to detect a SS/PBCH block within the range between the first and the second SS/PBCH blocks (identified by PCI and GSCN) until the UE completes to scan all SS rasters outside the GSCN range in the supported NR frequency bands.</u>

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

Table 13-16: Mapping between the combination of $k_{SSB}$ and RMSI-PDCCH-Config to $N_{GSCN}^{Offset}$ for FR1

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

Table 13-17: Mapping between the combination of $k_{SSB}$ and RMSI-PDCCH-Config to $N_{GSCN}^{Offset}$ for FR2

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.14

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. If a UE detects the second SS/PBCH block within $N_{GSCN}^{Reference} + N_{GSCN}^{Offset}$ and determines that a control resource set for Type0-PDCCH common search space is not present as specified in sub-clause 4.1, the UE shall no longer attempt to detect a SS/PBCH block within the range between the first and the second SS/PBCH blocks (identified by PCI and GSCN) until the UE completes to scan all SS rastes outside the GSCN range in this NR frequency band.

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

Table 13-16: Mapping between the combination of $k_{SSB}$ and *RMSI-PDCCH-Config* to $N_{GSCN}^{Offset}$ for FR1

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

Table 13-17: Mapping between the combination of $k_{SSB}$ and *RMSI-PDCCH-Config* to $N_{GSCN}^{Offset}$ for FR2

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.15

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. If a UE detects the second SS/PBCH block within $N_{GSCN}^{Reference} + N_{GSCN}^{Offset}$ and determines that a control resource set for Type0-PDCCH common search space is not present as specified in sub-clause 4.1 and the second SS/PBCH block indicates the GSCN by $N_{GSCN}^{Reference} + N_{GSCN}^{Offset}$ where the first SS/PBCH is present, the UE shall no longer attempt to detect a SS/PBCH block within the range between the first and the second SS/PBCH blocks (identified by PCI and GSCN) until the UE completes to scan all SS rastes outside the GSCN range in this NR frequency band.

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

**Table 13-16: Mapping between the combination of $k_{SSB}$ and *RMSI-PDCCH-Config* to $N_{GSCN}^{Offset}$ for FR1**

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

**Table 13-17: Mapping between the combination of $k_{SSB}$ and *RMSI-PDCCH-Config* to $N_{GSCN}^{Offset}$ for FR2**

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.16

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. <u>If a UE detects the second SS/PBCH block within $N_{GSCN}^{Reference} + N_{GSCN}^{Offset}$ and determines that a control resource set for Type0-PDCCH common search space is not present as specified in sub-clause 4.1, the UE shall no longer attempt to detect a SS/PBCH block within the range between the first and the second SS/PBCH blocks (identified by PCI and GSCN) for XXX (e.g. 300) seconds.</u>

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

**Table 13-16: Mapping between the combination of $k_{SSB}$ and *RMSI-PDCCH-Config* to $N_{GSCN}^{Offset}$ for FR1**

| $k_{SSB}$ | RMSI-PDCCH-Config | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ...., -512 |
| 29 | 0, 1, ..., 255 | -513, -514, ...., -768 |
| 30 | 0, 1, ..., 255 | Reserved, Reserved, ..., Reserved |

**Table 13-17: Mapping between the combination of $k_{SSB}$ and *RMSI-PDCCH-Config* to $N_{GSCN}^{Offset}$ for FR2**

| $k_{SSB}$ | RMSI-PDCCH-Config | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG.17

If a UE detects a first SS/PBCH block and determines that a control resource set for Type0-PDCCH common search space is not present, and for $24 \leq k_{SSB} \leq 30$ for FR1 or for $12 \leq k_{SSB} \leq 14$ for FR2, the UE determines the global synchronization channel number (GSCN) of a second SS/PBCH block having a control resource set for an associated Type0-PDCCH common search space as $N_{GSCN}^{Reference} + N_{GSCN}^{Offset}$. $N_{GSCN}^{Reference}$ is the GSCN of the first SS/PBCH block and $N_{GSCN}^{Offset}$ is a GSCN offset provided by Table 13-16 for FR1 and Table 13-17 for FR2. <ins>If a UE detects the second SS/PBCH block within $N_{GSCN}^{Reference} + N_{GSCN}^{Offset}$ and determines that a control resource set for Type0-PDCCH common search space is not present as specified in sub-clause 4.1 and the second SS/PBCH block indicates the GSCN by $N_{GSCN}^{Reference} + N_{GSCN}^{Offset}$ where the first SS/PBCH is present, the UE shall no longer attempt to detect a SS/PBCH block within the range between the first and the second SS/PBCH blocks (identified by PCI and GSCN) for XXX (e.g. 300) seconds.</ins>

If a UE detects a SS/PBCH block and determines that a control resource set for Type0-PDCCH common search space is not present, and for $k_{SSB} = 31$ for FR1 or for $k_{SSB} = 15$ for FR2, the UE determines that there is no SS/PBCH block having an associated Type0-PDCCH common search space within a GSCN range $[N_{GSCN}^{Reference} - N_{GSCN}^{Start}, N_{GSCN}^{Reference} + N_{GSCN}^{End}]$. $N_{GSCN}^{Start}$ and $N_{GSCN}^{End}$ are respectively determined by the four most significant bits and the four least significant bits of *RMSI-PDCCH-Config*.

**Table 13-16: Mapping between the combination of $k_{SSB}$ and *RMSI-PDCCH-Config* to $N_{GSCN}^{Offset}$ for FR1**

| $k_{SSB}$ | *RMSI-PDCCH-Config* | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ...., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ...., -768 |
| 30 | 0, 1, ..., 255 | Reserved, Reserved, ..., Reserved |

**Table 13-17: Mapping between the combination of $k_{SSB}$ and *RMSI-PDCCH-Config* to $N_{GSCN}^{Offset}$ for FR2**

| $k_{SSB}$ | *RMSI-PDCCH-Config* | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

USER EQUIPMENT

TECHNICAL FIELD

The present invention relates to a field of radio communication, and more specifically relates to user equipment.

BACKGROUND ART

In a Long Term Evolution (LTE) radio communication system and a Long Term Evolution Advanced (LTE-A) radio communication system, user equipment (UE) performs cell search to find a cell to be connected for establishing a physical channel. During cell search, the user equipment obtains a physical cell identity (PCI) of the cell and performs synchronization with respect to radio frame timing.

In the LTE system, a primary synchronization signal (PSS) and a secondary synchronization signal (SSS) are defined as synchronization signals (SSs) for the purpose of efficient cell search. The PSS is mainly used for synchronization with respect to symbol timing and detection of a local ID, and the SSS is used for synchronization with respect to a radio frame and detection of a cell group ID. The PCI of the cell can be obtained by detecting the combination of the sequences of these two signals.

Further, a physical broadcast channel (PBCH) includes basic system information to be read by the user equipment immediately after cell search. The basic system information is referred to as a master information block (MIB). A system information block (SIB) that is system information other than the MIB is transmitted on a physical downlink shared channel (PDSCH). In order to obtain the SIB, the user equipment needs to obtain control information transmitted on a physical downlink control channel (PDCCH).

PRIOR-ART DOCUMENTS

Non-Patent Documents

[Non-Patent Document 1] 3GPP T538.211 V2.0.0 (2017-12)
[Non-Patent Document 2] 3GPP T538.213 V2.0.0 (2017-12)

DISCLOSURE OF INVENTION

Problem(s) to be Solved by the Invention

In the 3rd Generation Partnership Project (3GPP), a next generation communication standard (5G or NR) of LTE and LTE-A is under discussion. In NR, it is expected that user equipment will detect a synchronization signal and obtain a MIB that is part of system information upon initial access, as with LTE and LTE-A.

In LTE, a synchronization signal and a PBCH are placed at the center of the system band and a PDCCH is placed at a predetermined position in the system band. On the other hand, in NR, a synchronization signal and a PBCH is defined as a unit of a frequency block referred to as an SS/PBCH block. One or more SS/PBCH blocks can be placed in a carrier frequency band (see Non-Patent Document 1).

User equipment receives a synchronization signal in an SS/PBCH block, obtains a MIB, and then obtains remaining system information referred to as remaining minimum system information (RMSI) transmitted on a PDSCH. In order to obtain the RMSI, the user equipment needs to properly determine a search space (hereinafter referred to as a PDCCH search space) to find a PDCCH (see Non-Patent Document 2).

It is an object of the present invention to provide a solution for user equipment to properly determine a PDCCH search space.

Means for Solving the Problem(s)

In one aspect of the present invention, there is provision for user equipment, including:

a reception unit configured to receive first system information in a frequency block where a synchronization signal is placed and third system information in another frequency block; and a control unit configured to stop detecting the synchronization signal, (1) based on a parameter value determined from the first system information, (1-1) when a control channel search space for receiving second system information does not exist and (1-2) when the parameter value is within a predetermined range and (2) when the control channel search space for receiving the second system information does not exist based on a parameter value determined from the third system information.

Advantageous Effect of the Invention

According to the present invention, user equipment can properly determine a PDCCH search space.

BRIEF DESCRIPTION OF THE DRAWINGS

FIG. 4 is a diagram illustrating a relationship between $k_{SSB}$, RMSI-PDCCH-Config, and $N_{GSCN}^{Offset}$ in the case of FR1.

FIG. 5 is a diagram illustrating a relationship between $k_{SSB}$, RMSI-PDCCH-Config, and $N_{GSCN}^{Offset}$ in the case of FR2.

FIG. 6 is an exemplary operation of user equipment according to an embodiment of the present invention.

FIG. 7 is an exemplary operation of user equipment according to an embodiment of the present invention.

FIG. 8 is an exemplary operation of user equipment according to an embodiment of the present invention.

FIG. 9 is an exemplary operation of user equipment according to an embodiment of the present invention.

FIG. 10 is an exemplary operation of user equipment according to an embodiment of the present invention.

FIG. 11 is an exemplary operation of user equipment according to an embodiment of the present invention.

FIG. 12 is an exemplary operation of user equipment according to an embodiment of the present invention.

FIG. 13 is an exemplary operation of user equipment according to an embodiment of the present invention.

FIG. 14 is an exemplary operation of user equipment according to an embodiment of the present invention.

FIG. 15 is an exemplary operation of user equipment according to an embodiment of the present invention.

FIG. 16 is an exemplary operation of user equipment according to an embodiment of the present invention.

FIG. 17 is an exemplary operation of user equipment according to an embodiment of the present invention.

DETAILED DESCRIPTION OF THE PREFERRED EMBODIMENTS

In the following, embodiments will be described with reference to the accompanying drawings. Note that the embodiments described below are merely examples, and an embodiment to which the present invention can be applied is not necessarily to be limited to the following embodiments. For example, in the embodiments, a radio communication system is assumed to be an NR system that is a succeeding system of an LTE system or an LTE-advanced system. However, the present invention is applicable to another system in which user equipment determines a PDCCH search space to obtain system information.

<Overview of System Configuration and Operation>

Figure 1:
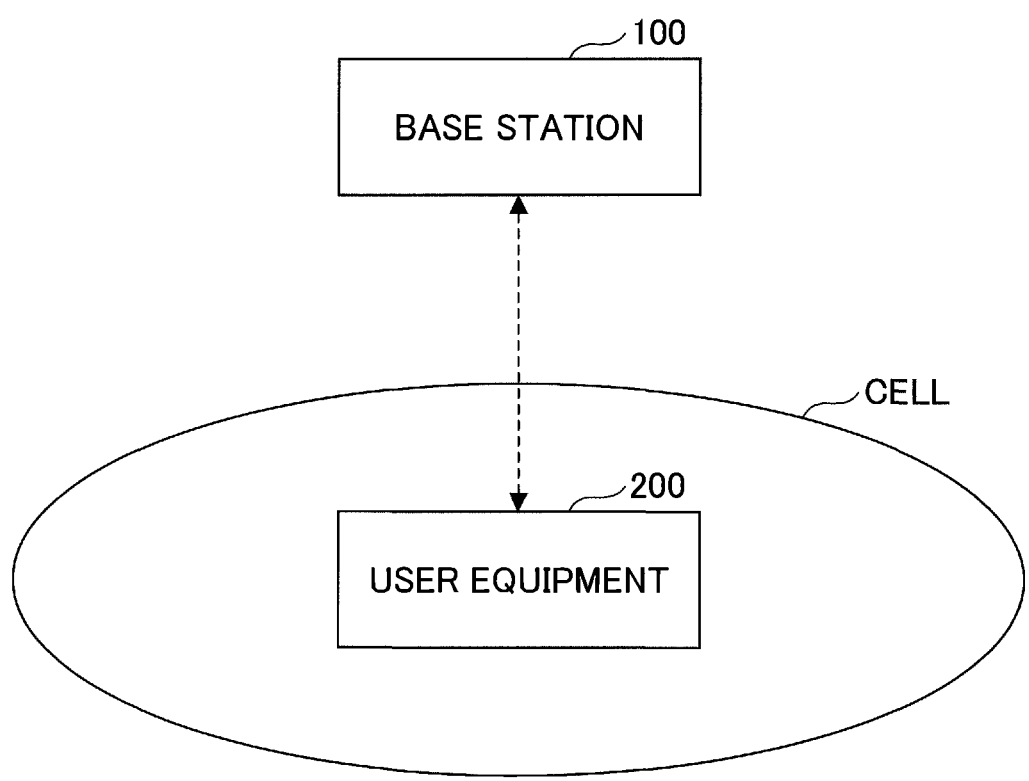
FIG. 1 is a diagram illustrating a configuration of a radio communication system according to an embodiment of the present invention.

FIG. 1 is a diagram illustrating a configuration of a radio communication system according to an embodiment of the present invention. As illustrated in FIG. 1, the radio communication system according to this embodiment includes a base station (also referred to as a gNB) 100 and user equipment (also referred to as UE) 200. While one base station 100 and one user equipment 200 are illustrated in FIG. 1 as an example, a plurality of base stations 100 or a plurality of user equipments 200 may be included.

The base station 100 can accommodate one or more (for example, three) cells (also referred to as "sectors"). When the base station 100 accommodates a plurality of cells, the entire coverage area of the base station 100 can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "gNB", "eNB", "cell", and "sector" can be used interchangeably in this specification. In some cases, the base station 100 is also referred to as a fixed station, a NodeB, a gNodeB (gNB), an eNodeB (eNB), an access point, a femto cell, a small cell, or the like.

In some cases, the user equipment 200 is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

Figure 2:
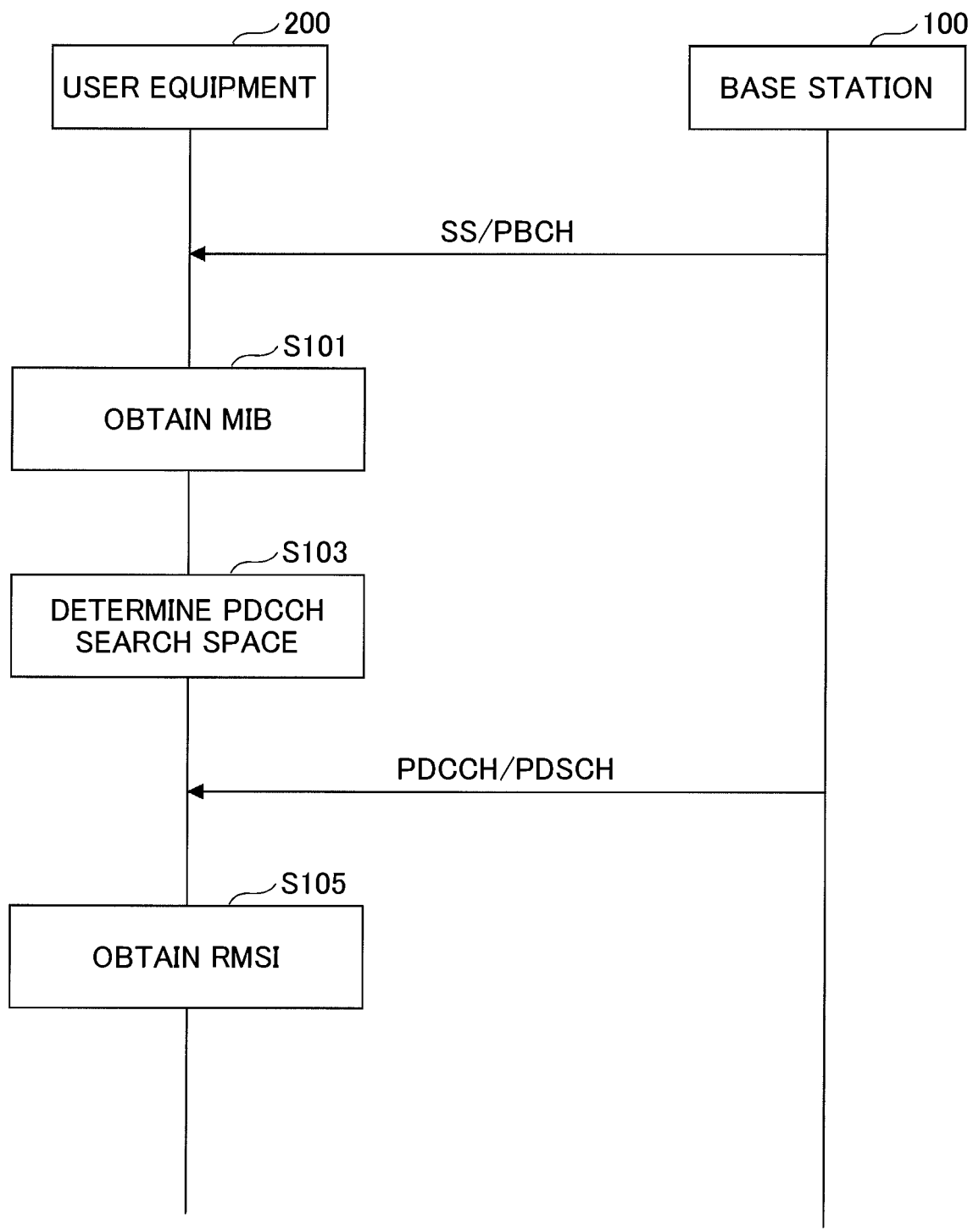
FIG. 2 is a sequence diagram illustrating an operation of a radio communication system according to an embodiment of the present invention.

FIG. 2 is a sequence diagram illustrating an operation of a radio communication system according to an embodiment of the present invention. With reference to FIG. 2, initial access in the radio communication system illustrated in FIG. 1 is described. Initial access is performed according to the following procedures: detection of a synchronization signal and obtainment of system information (MIB and RMSI). The system information may be referred to as broadcast information.

The user equipment 200 receives a PSS and an SSS transmitted from the base station 100 in a predetermined frequency block (SS/PBCH block), and detects a cell frequency, a reception timing, and a cell ID. Then, the user equipment 200 obtains system information (MIB) transmitted on a PBCH in the SS/PBCH block where the PSS and the SSS is received (S101). One or more SS/PBCH blocks may be set in a carrier frequency band.

The user equipment 200 determines a PDCCH search space for receiving remaining system information (RMSI) based on the MIB transmitted on the PBCH (S103). The PDCCH search space is not a search space dedicated for the user equipment 200, but a search space to be found in common by user equipments in the cell. Thus, the PDCCH search space is also referred to as a PDCCH common search space.

When the user equipment 200 receives, in the PDCCH search space, control information necessary to receive RMSI, the user equipment 200 can receive the RMSI transmitted on a PDSCH based on the control information (S105).

Even if the SS/PBCH block is determined, a PDCCH search space cannot be always determined. For example, it is possible that the base station 100 transmits a MIB in a certain SS/PBCH block, but does not transmit RMSI corresponding to the MIB. In this case, the base station 100 may (1) instruct the user equipment 200 to detect another SS/PBCH block, or (2) specify a frequency range that is at least part of the carrier frequency band and instruct the user equipment 200 to stop detecting an SS/PBCH block in the frequency range in order to reduce a workload of the user equipment 200. The instructions regarding (1) and (2) can be implemented by changing a configuration value in the MIB transmitted from the base station 100 to the user equipment 200.

In the latter case (2), it is possible that a malicious attacker installs a fake base station (fake gNB) to transmit SSs and a MIB in the carrier frequency band of a certain operator and instructs user equipment to stop detecting an SS/PBCH block in the whole carrier frequency band using the MIB. When the user equipment 200 receives the MIB transmitted from the fake base station, there is a risk that the user equipment 200 cannot access a proper base station of the operator. In some cases, there is a risk that the user equipment 200 cannot access a proper base station unless the user equipment 200 is restarted, or there is a risk that the user equipment 200 cannot access a proper base station even if the user equipment 200 moves around areas.

Even in the former case (1), when the user equipment 200 receives an improper MIB in the other SS/PBCH block, there is a risk that the user equipment 200 cannot access a proper base station.

For this reason, the following embodiment describes an example of limiting a time period during which detection of an SS/PBCH block is stopped in a frequency band that is at least part of the carrier frequency band. Specifically, detection of an SS/PBCH block is stopped in the frequency band until a predetermined condition is satisfied. After the predetermined condition is satisfied, detection of an SS/PBCH block in the frequency band is resumed. With this limitation, the user equipment 200 can access a proper base station after a certain time period even if the user equipment 200 receives the MIB from the fake base station.

Further, the following embodiment describes an example of stopping detecting an SS/BOCK block under a certain condition or limiting a time period during which detection of an SS/PBCH block is stopped, even if the user equipment 200 receives the MIB in the other SS/PBCH block.

<Exemplary Operation in User Equipment>

Figure 3:
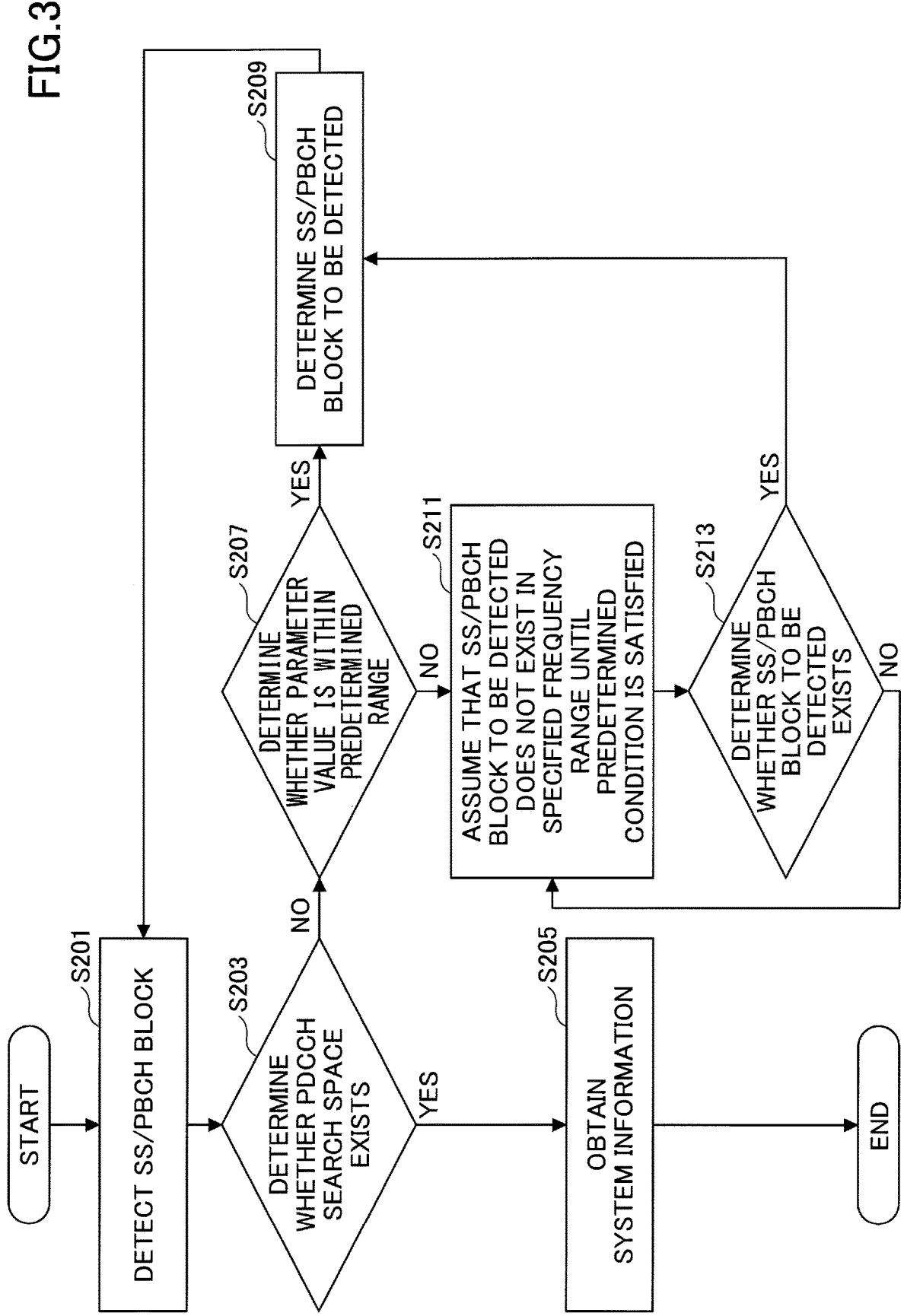
FIG. 3 is a flowchart illustrating an operation of user equipment according to an embodiment of the present invention.

FIG. 3 is a flowchart illustrating an operation of the user equipment 200 according to an embodiment of the present invention.

The user equipment 200 detects an SS/PBCH block and obtains a MIB (S201). This step is the same as S101 in FIG. 2.

The user equipment 200 determines, based on the MIB, whether a PDCCH search space for receiving RMSI exists (S203). Whether a PDCCH search space exists may be determined based on a parameter value ($k_{SSB}$) determined from the MIB. $k_{SSB}$ is a parameter representing a frequency offset between an SS/PBCH and a PDCCH/PDSCH, and specifically is determined by a MIB parameter (ssb-subcarrierOffset) and a PBCH payload. $k_{SSB}$ is also used for reception processing of the PDCCH. For example, when the carrier frequency band is FR1 (a frequency band lower than or equal to 6 GHz) and when $k_{SSB}<=23$ is satisfied, or when the carrier frequency band is FR2 (a frequency band higher than 6 GHz) and when $k_{SSB}<=11$ is satisfied, the user equipment 200 determines that a radio resource (control resource set) for the PDCCH search space exists.

When the base station 100 transmits a MIB in a certain SS/PBCH block and transmits RMSI corresponding to the MIB, a PDCCH search space for receiving RMSI exists and a radio resource for the PDCCH search space also exists. In this case (S203: Yes), the user equipment 200 finds the PDCCH search space to receive control information and receives RMSI transmitted on the PDSCH based on the control information (S205).

On the other hand, when the base station 100 transmits a MIB in a certain SS/PBCH block but does not transmit RMSI corresponding to the MIB, a PDCCH search space for receiving RMSI does not exist and a radio resource for the PDCCH search space does not exist, either. As described above, the base station 100 may (1) instruct the user equipment 200 to detect another SS/PBCH block, or (2) specify a frequency range that is at least part of the carrier frequency band and instruct the user equipment 200 to stop detecting an SS/PBCH block in the frequency range in order to reduce a workload of the user equipment 200. For the instructions regarding (1) and (2), the parameter value ($k_{SSB}$) determined from the MIB can be used.

When a PDCCH search space does not exist (S203: No), the user equipment 200 determines whether the parameter value ($k_{SSB}$) determined from the MIB is within a predetermined range (S207). For example, when the carrier frequency band is FR1, the user equipment 200 determines whether $24<=k_{SSB}<=30$ is satisfied. For example, when the carrier frequency band is FR2, the user equipment 200 determines whether $12<=k_{SSB}<=14$ is satisfied.

For example, when the carrier frequency band is FR1 and when $24<=k_{SSB}<=30$ is satisfied, or when the carrier frequency band is FR2 and when $12<=k_{SSB}<=14$ is satisfied, the user equipment 200 determines that another SS/PBCK block should be detected in order to determine a PDCCH search space and determines an SS/PBCH block to be detected (S209). The SS/PBCH block to be detected is determined based on $k_{SSB}$ and RMSI-PDCCH-Config included in the MIB. RMSI-PDCCH-Config is configuration information necessary to receive RMSI on the PDCCH. A global synchronization channel number GSCN of the SS/PBCH block to be detected may be derived by $N_{GSCN}^{Reference}+N_{GSCN}^{Offset}$. $N_{GSCN}^{Reference}$ is a GSCN of the SS/PBCK block detected in step S201 and $N_{GSCN}^{Offset}$ is a value determined from the table illustrated in FIG. 4 or FIG. 5 according to a combination of $k_{SSB}$ and RMSI-PDCCH-Config. FIG. 4 illustrates a relationship between $k_{SSB}$, RMSI-PDCCH-Config, and $N_{GSCN}^{Offset}$ in the case of FR1, and FIG. 5 illustrates a relationship between $k_{SSB}$, RMSI-PDCCH-Config, and $N_{GSCN}^{Offset}$ in the case of FR2. The relationships illustrated in FIG. 4 and FIG. 5 may be determined in advance in the specification.

After determining the SS/PBCH block to be detected, the operational flow returns to step S201. The operational flow after returning to step S201 is described below.

On the other hand, when the carrier frequency is FR1 and when $k_{SSB}=31$ is satisfied (when $24<=k_{SSB}<=30$ is not satisfied) or when the carrier frequency is FR2 and when $k_{SSB}=15$ is satisfied (when $12<=k_{SSB}<=14$ is not satisfied), the user equipment 200 assumes that an SS/PBCH block to be detected does not exist in a frequency range that is at least part of the carrier frequency band (S211). In this step, a predetermined condition is provided with respect to a time period during which the user equipment 200 assumes that an SS/PBCH block to be detected does not exist. Accordingly, the user equipment 200 assumes that an SS/PBCH block to be detected does not exist in a frequency range that is at least part of the carrier frequency band until the predetermined condition is satisfied. The frequency range in which an SS/PBCH block to be detected does not exist may be derived by $[N_{GSCN}^{Reference}-N_{GSCN}^{Start}, N_{GSCN}^{Reference}+N_{GSCN}^{End}]$. $N_{GSCN}^{Start}$ and $N_{GSCN}^{End}$ may be determined based on RMSI-PDCCH-Config, for example, based on a predetermined number of most significant bits and a predetermined number of least significant bits of RMSI-PDCCH-Config, respectively.

For example, the user equipment 200 assumes that an SS/PBCH block to be detected does not exist in the frequency range $[N_{GSCN}^{Reference}-N_{GSCN}^{Start}, N_{GSCN}^{Reference}+N_{GSCN}^{End}]$ until detection of an SS/PBCH block is completed over frequencies other than the frequency range $[N_{GSCN}^{Reference}-N_{GSCN}^{Start}, N_{GSCN}^{Reference}+N_{GSCN}^{End}]$. It should be noted that the condition that detection of an SS/PBCH block is completed may be a condition that detection of an SS/PBCH block is completed in the whole carrier frequency band supported by the user equipment 200, or may be a condition that detection of an SS/PBCH block is completed in the carrier frequency band in which detection of the SS/PBCH block is attempted in step S201. For example, when the user equipment 200 supports 700 MHz band, 1.5 GHz band, and 2 GHz band, the user equipment 200 may assume that an SS/PBCH block to be detected does not exist in the frequency band $[N_{GSCN}^{Reference}-N_{GSCN}^{Start}, N_{GSCN}^{Reference}+N_{GSCN}^{End}]$ until detection of an SS/PBCH block is completed in all the frequency bands. Alternatively, when the user equipment 200 currently attempts to detect an SS/PBCH block in 1.5 GHz band, the user equipment 200 may assume that an SS/PBCH block to be detected does not exist in the frequency band $[N_{GSCN}^{Reference}-N_{GSCN}^{Start}, N_{GSCN}^{Reference}+N_{GSCN}^{End}]$ until detection of an SS/PBCH block is completed in 1.5 GHz band.

For example, the user equipment 200 may alternatively assume that an SS/PBCH block to be detected does not exist in the frequency band $[N_{GSCN}^{Reference}-N_{GSCN}^{Start}, N_{GSCN}^{Reference}+N_{GSCN}^{End}]$ until a predetermined time period (for example, 300 seconds) has elapsed. The predetermined time period (for example, 300 seconds) may be fixed in the specification or may be provided to the user equipment 200 as a parameter value in the MIB.

Then, the user equipment 200 determines whether an SS/PBCH block to be detected over frequencies other than the frequency range [$N_{GSCN}^{Reference} - N_{GSCN}^{Start}$, $N_{GSCN}^{Reference} + N_{GSCN}^{End}$] exists (S213). If it exists, the user equipment 200 determines an SS/PBCH block to be detected (S209), and then the operational flow returns to step S201, where the user equipment 200 detects an SS/PBCH block and obtains a MIB and RMSI as described above.

When an SS/PBCH block to be detected over frequencies other than the frequency band [$N_{GSCN}^{Reference} - N_{GSCN}^{Start}$, $N_{GSCN}^{Reference} + N_{GSCN}^{End}$] does not exist, the operational flow returns to step S211. At this moment, when the predetermined condition is satisfied, for example, when detection of an SS/PBCH block over frequencies other than the frequency range [$N_{GSCN}^{Reference} - N_{GSCN}^{Start}$, $N_{GSCN}^{Reference} + N_{GSCN}^{End}$] is completed, or when the predetermined time period (for example, 300 seconds) has elapsed, the SS/PBCH block in the frequency band [$N_{GSCN}^{Reference} - N_{GSCN}^{Start}$, $N_{GSCN}^{Reference} + N_{GSCN}^{End}$] is treated as an SS/PBCH block to be detected. The user equipment 200 determines an SS/PBCH block to be detected (S209), and then the operational flow returns to step S201, where the user equipment 200 detects an SS/PBCH block and obtains a MIB and RMSI as described above.

With reference to FIGS. 6-17, the operational flow after determining an SS/PBCH block to be detected and after returning to step S201 is further described. The operational flow as described below is independent of S211 and S213 in FIG. 3, and S211 and S213 in FIG. 3 may not be performed when the operational flow is executed.

As described above in step S201, the user equipment 200 obtains a new MIB (hereinafter referred to as MIB') in the SS/PBCH block to be detected.

As described above in step S203, the user equipment 200 determines, based on the MIB', whether a PDCCH search space for receiving RMSI exists. Whether a PDCCH search space exists may be determined based on a parameter value ($k_{SSB}$) determined from the MIB'. For example, when the carrier frequency band is FR1 (a frequency band lower than or equal to 6 GHz) and when $k_{SSB} <= 23$ is satisfied, or when the carrier frequency band is FR2 (a frequency band higher than 6 GHz) and when $k_{SSB} <= 11$ is satisfied, the user equipment 200 determines that a radio resource (control resource set) for the PDCCH search space exists.

When the base station 100 transmits RMSI corresponding to the MIB', a PDCCH search space for receiving RMSI exists and a radio resource for the PDCCH search space also exists. In this case, the user equipment 200 finds the PDCCH search space to receive control information and receives RMSI transmitted on the PDSCH based on the control information.

On the other hand, when the base station 100 does not transmit RMSI corresponding to the MIB', a PDCCH search space for receiving RMSI does not exist and a radio resource for the PDCCH search space does not exist, either. Alternatively, when $N_{GSCN}^{Reference} + N_{GSCN}^{Offset}$ as determined above based on the MIB' corresponds to the GSCN of the SS/PBCH block where the MIB has been detected in step S201, for example, the user equipment 200 repeats reception of MIB and MIB'.

For this reason, when a PDCCH search space does not exist, the user equipment 200 assumes that an SS/PBCH block to be detected does not exist in a frequency range that is at least part of the carrier frequency band and does not attempt to detect an SS/PBCH block in the frequency range.

In this case, a predetermined condition is provided with respect to a time period during which the user equipment 200 assumes that an SS/PBCH block to be detected does not exist. Accordingly, the user equipment 200 assumes that an SS/PBCH block to be detected does not exist in a frequency range that is at least part of the carrier frequency band until the predetermined condition is satisfied. The frequency range in which an SS/PBCH block to be detected does not exist may include both an SS/PBCH block corresponding to $N_{GSCN}^{Reference} + N_{GSCN}^{End}$ determined based on the MIB' and the SS/PBCH block where the MIB has been initially received in step S201 (see FIGS. 6-11, for example). More specifically, the user equipment 200 does not attempt to decode a GSCN and a PCI of the SS/PBCH block where the MIB has been received and a GSCN and a PCI of the SS/PBCH block where the MIB' has been received.

FIG. 6 illustrates that the user equipment 200 detects MIB' in an SS/PBCH block corresponding to $N_{GSCN}^{Reference} + N_{GSCN}^{Offset}$, but a PDCCH search space does not exist. FIG. 6 further illustrates that the user equipment 200 does not attempt to decode the SS/PBCH block where the MIB has been received and the SS/PBCH block where the MIB' has been received until detection of an SS/PBCH block is completed in the whole carrier frequency band supported by the user equipment 200.

FIG. 7 illustrates that the user equipment 200 detects MIB' in an SS/PBCH block corresponding to $N_{GSCN}^{Reference} + N_{GSCN}^{Offset}$, but a PDCCH search space does not exist and $N_{GSCN}^{Reference} + N_{GSCN}^{Offset}$ determined based on MIB' indicates the SS/PBCH block where the MIB has been initially received (in other words, the user equipment 200 repeats reception of MIB and MIB'). FIG. 7 further illustrates that the user equipment 200 does not attempt to decode the SS/PBCH block where the MIB has been received and the SS/PBCH block where the MIB' has been received until detection of an SS/PBCH block is completed in the whole carrier frequency band supported by the user equipment 200.

FIG. 8 illustrates that the user equipment 200 detects MIB' in an SS/PBCH block corresponding to $N_{GSCN}^{Reference} + N_{GSCN}^{Offset}$, but a PDCCH search space does not exist. FIG. 8 further illustrates that the user equipment 200 does not attempt to decode the SS/PBCH block where the MIB has been received and the SS/PBCH block where the MIB' has been received until detection of an SS/PBCH block is completed in the carrier frequency band in which detection of the SS/PBCH block is currently attempted.

FIG. 9 illustrates that the user equipment 200 detects MIB' in an SS/PBCH block corresponding to $N_{GSCN}^{Reference} + N_{GSCN}^{Offset}$, but a PDCCH search space does not exist and $N_{GSCN}^{Reference} + N_{GSCN}^{Offset}$ determined based on MIB' indicates the SS/PBCH block where the MIB has been initially received (in other words, the user equipment 200 repeats reception of MIB and MIB'). FIG. 9 further illustrates that the user equipment 200 does not attempt to decode the SS/PBCH block where the MIB has been received and the SS/PBCH block where the MIB' has been received until detection of an SS/PBCH block is completed in the carrier frequency band in which detection of the SS/PBCH block is currently attempted.

FIG. 10 illustrates that the user equipment 200 detects MIB' in an SS/PBCH block corresponding to $N_{GSCN}^{Reference} + N_{GSCN}^{Offset}$, but a PDCCH search space does not exist. FIG. 10 further illustrates that the user equipment 200 does not attempt to decode the SS/PBCH block where the MIB has been received and the SS/PBCH block where the MIB' has been received until a predetermined time period (for example, 300 seconds) has elapsed.

FIG. 11 illustrates that the user equipment 200 detects MIB' in an SS/PBCH block corresponding to $N_{GSCN}^{Reference}+N_{GSCN}^{Offset}$, but a PDCCH search space does not exist and $N_{GSCN}^{Reference}+N_{GSCN}^{Offset}$ determined based on MIB' indicates the SS/PBCH block where the MIB has been initially received (in other words, the user equipment 200 repeats reception of MIB and MIB'). FIG. 11 further illustrates that the user equipment 200 does not attempt to decode the SS/PBCH block where the MIB has been received and the SS/PBCH block where the MIB' has been received until a predetermined time period (for example, 300 seconds) has elapsed.

Alternatively, the frequency range in which an SS/PBCH block to be detected does not exist may be a range between the SS/BPCH block where the MIB has been initially received in step S201 and the SS/PBCH block where the MIB' has been subsequently received in step S201 (see FIGS. 12-17, for example). More specifically, the user equipment 200 does not attempt to decode an SS/PBCH block in a range between the GSCN of the SS/PBCH block where the MIB has been received and the GSCN of the SS/PBCH block where the MIB' has been received.

FIG. 12 illustrates that the user equipment 200 detects MIB' in an SS/PBCH block corresponding to $N_{GSCN}^{Reference}+N_{GSCN}^{Offset}$, but a PDCCH search space does not exist. FIG. 12 further illustrates that the user equipment 200 does not attempt to decode an SS/PBCH block in the range between the SS/PBCH block where the MIB has been received and the SS/PBCH block where the MIB' has been received until detection of an SS/PBCH block is completed in the whole carrier frequency band supported by the user equipment 200.

FIG. 13 illustrates that the user equipment 200 detects MIB' in an SS/PBCH block corresponding to $N_{GSCN}^{Reference}+N_{GSCN}^{Offset}$, but a PDCCH search space does not exist and $N_{GSCN}^{Reference}+N_{GSCN}^{Offset}$ determined based on MIB' indicates the SS/PBCH block where the MIB has been initially received (in other words, the user equipment 200 repeats reception of MIB and MIB'). FIG. 13 further illustrates that the user equipment 200 does not attempt to decode an SS/PBCH block in the range between the SS/PBCH block where the MIB has been received and the SS/PBCH block where the MIB' has been received until detection of an SS/PBCH block is completed in the whole carrier frequency band supported by the user equipment 200.

FIG. 14 illustrates that the user equipment 200 detects MIB' in an SS/PBCH block corresponding to $N_{GSCN}^{Reference}+N_{GSCN}^{Offset}$, but a PDCCH search space does not exist. FIG. 14 further illustrates that the user equipment 200 does not attempt to decode an SS/PBCH block in the range between the SS/PBCH block where the MIB has been received and the SS/PBCH block where the MIB' has been received until detection of an SS/PBCH block is completed in the carrier frequency band in which detection of the SS/PBCH block is currently attempted.

FIG. 15 illustrates that the user equipment 200 detects MIB' in an SS/PBCH block corresponding to $N_{GSCN}^{Reference}+N_{GSCN}^{Offset}$, but a PDCCH search space does not exist and $N_{GSCN}^{Reference}+N_{GSCN}^{Offset}$ determined based on MIB' indicates the SS/PBCH block where the MIB has been initially received (in other words, the user equipment 200 repeats reception of MIB and MIB'). FIG. 15 further illustrates that the user equipment 200 does not attempt to decode an SS/PBCH block in the range between the SS/PBCH block where the MIB has been received and the SS/PBCH block where the MIB' has been received until detection of an SS/PBCH block is completed in the carrier frequency band in which detection of the SS/PBCH block is currently attempted.

FIG. 16 illustrates that the user equipment 200 detects MIB' in an SS/PBCH block corresponding to $N_{GSCN}^{Reference}+N_{GSCN}^{Offset}$, but a PDCCH search space does not exist. FIG. 16 further illustrates that the user equipment 200 does not attempt to decode an SS/PBCH block in the range between the SS/PBCH block where the MIB has been received and the SS/PBCH block where the MIB' has been received until a predetermined time period (for example, 300 seconds) has elapsed.

FIG. 17 illustrates that the user equipment 200 detects MIB' in an SS/PBCH block corresponding to $N_{GSCN}^{Reference}+N_{GSCN}^{Offset}$, but a PDCCH search space does not exist and $N_{GSCN}^{Reference}+N_{GSCN}^{Offset}$ determined based on MIB' indicates the SS/PBCH block where the MIB has been initially received (in other words, the user equipment 200 repeats reception of MIB and MIB'). FIG. 17 further illustrates that the user equipment 200 does not attempt to decode an SS/PBCH block in the range between the SS/PBCH block where the MIB has been received and the SS/PBCH block where the MIB' has been received until a predetermined time period (for example, 300 seconds) has elapsed.

As described above, in each of the cases where the user equipment 200 assumes that an SS/PBCH block to be detected does not exist, a condition that the user equipment 200 repeats reception of MIB and MIB' may be considered in addition to a condition that a PDCCH search space does not exist (see FIGS. 7, 9, 11, 13, 15, and 17, for example). In other words, when a PDCCH search space does not exist and when $N_{GSCN}^{Reference}+N_{GSCN}^{Offset}$ determined based on the MIB' corresponds to the SS/PBCH block where the MIB has been detected, the user equipment 200 assumes that an SS/PBCH block to be detected does not exist in a frequency range that is at least part of the carrier frequency band and does not attempt to detect an SS/PBCH block in the frequency range. In this case, a predetermined condition is provided with respect to a time period during which the user equipment 200 assumes that an SS/PBCH block to be detected does not exist. Accordingly, the user equipment 200 assumes that an SS/PBCH block to be detected does not exist in a frequency range that is at least part of the carrier frequency band until the predetermined condition is satisfied. The frequency range in which an SS/PBCH block to be detected does not exist may include both an SS/PBCH block corresponding to $N_{GSCN}^{Reference}+N_{GSCN}^{End}$ determined based on the MIB' and the SS/PBCH block where the MIB has been initially received in step S201. Alternatively, the frequency range in which an SS/PBCH block to be detected does not exist may be a range between the SS/PBCH block where the MIB has been initially received in step S201 and the SS/PBCH block where the MIB' has been subsequently received in step S201.

For example, the user equipment 200 assumes that an SS/PBCH block to be detected does not exist in the frequency range as described above until detection of an SS/PBCH block is completed over frequencies other than the frequency range. It should be noted that the condition that detection of an SS/PBCH block is completed may be a condition that detection of an SS/PBCH block is completed in the whole carrier frequency band supported by the user equipment 200 (see FIGS. 6, 7, 12 and 13, for example), or may be a condition that detection of an SS/PBCH block is completed in the carrier frequency band in which detection of the SS/PBCH block is attempted in step S201 (see FIGS.

8, 9, 14, and 15, for example). For example, when the user equipment 200 supports 700 MHz band, 1.5 GHz band, and 2 GHz band, the user equipment 200 may assume that an SS/PBCH block to be detected does not exist in the frequency band until detection of an SS/PBCH block is completed in all the frequency bands. Alternatively, when the user equipment 200 currently attempts to detect an SS/PBCH block in 1.5 GHz band, the user equipment 200 may assume that an SS/PBCH block to be detected does not exist in the frequency band until detection of an SS/PBCH block is completed in 1.5 GHz band.

For example, the user equipment 200 may alternatively assume that an SS/PBCH block to be detected does not exist in the frequency band as described above until a predetermined time period (for example, 300 seconds) has elapsed (see FIGS. 10, 11, 16, and 17, for example). The predetermined time period (for example, 300 seconds) may be fixed in the specification or may be provided to the user equipment 200 as a parameter value in the MIB (or MIB').

The condition that the user equipment 200 does not attempt to decode an SS/PBCH block in any of FIGS. 6-17 (for example, until detection of an SS/PBCH block is completed in the whole carrier frequency band, until detection of an SS/PBCH is completed in the carrier frequency band in which detection of the SS/PBCH is currently attempted, or until a predetermined time period has elapsed) is merely an example. When the user equipment 200 receives an improper MIB according to which a PDCCH search space cannot be determined, the user equipment 200 may stop detecting an SS/PBCH block.

Then, the user equipment 200 determines whether an SS/PBCH block to be detected over frequencies other than the frequency range as described above exists. If it exists, the user equipment 200 determines an SS/PBCH block to be detected, and then the operational flow returns to step S201, where the user equipment 200 detects an SS/PBCH block and obtains a MIB and RMSI as described above.

When an SS/PBCH block to be detected over frequencies other than the frequency band as described above does not exist, the user equipment 200 determines whether the predetermined condition is satisfied. For example, when detection of an SS/PBCH block over frequencies other than the frequency range is completed, or when the predetermined time period (for example, 300 seconds) has elapsed, the SS/PBCH block in the frequency band is treated as an SS/PBCH block to be detected. The user equipment 200 determines an SS/PBCH block to be detected, and then the operational flow returns to step S201, where the user equipment 200 detects an SS/PBCH block and obtains a MIB and RMSI as described above.

In the description of FIGS. 3-17, although information such as $k_{SSB}$, RMSI-PDCCH-Config, and so on transmitted on the PBCH is used as an example for description, another kind of information transmitted on the PBCH or another channel may be alternatively used.

<Functional Configuration>

In the following, functional configurations of the base station 100 and user equipment 200 that are capable of executing the processes described above are described.

Figure 18:
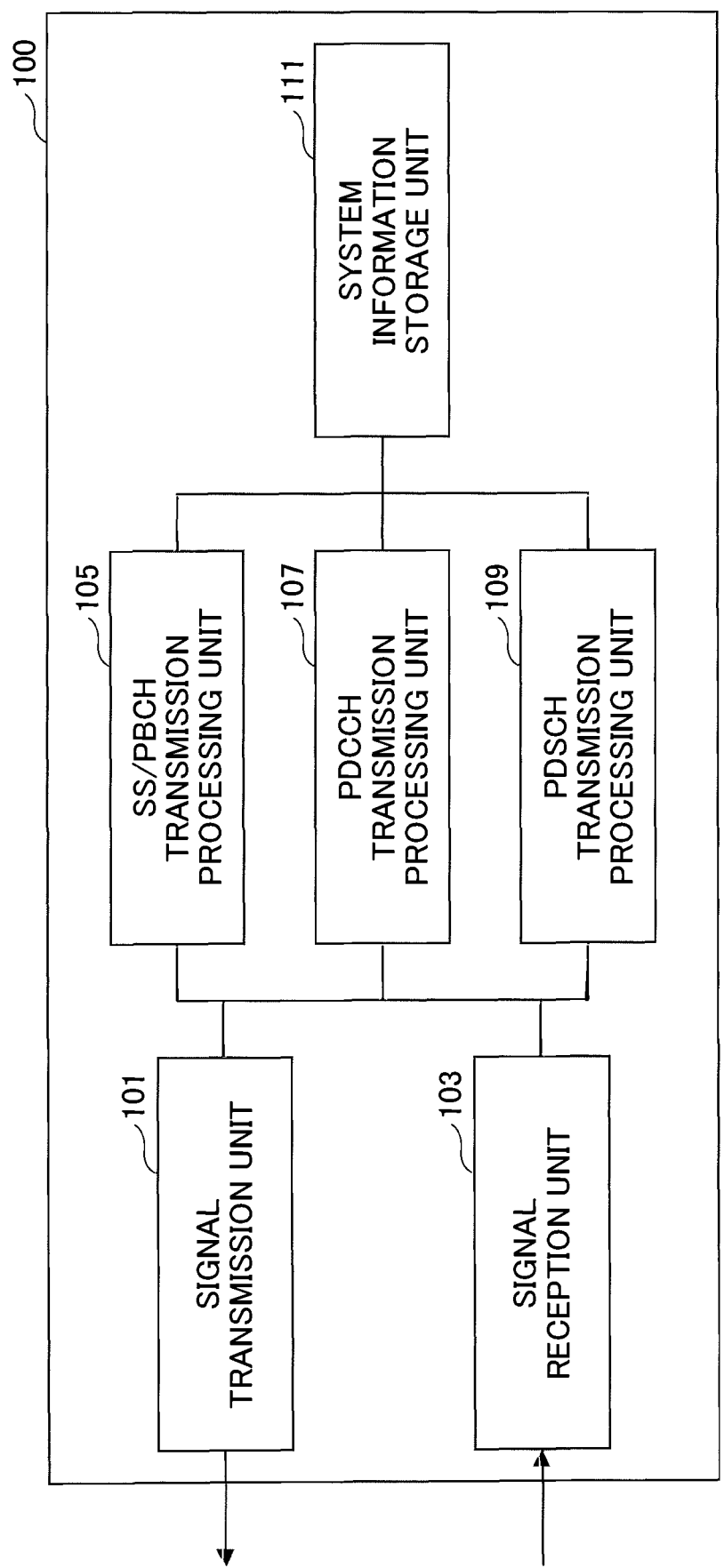
FIG. 18 is a diagram illustrating an example of a functional configuration of a base station according to an embodiment of the present invention.

FIG. 18 is a diagram illustrating an example of a functional configuration of the base station 100 according to an embodiment of the present invention. As illustrated in FIG. 18, the base station 100 includes a signal transmission unit 101, a signal reception unit 103, an SS/PBCH transmission processing unit 105, a PDCCH transmission processing unit 107, a PDSCH transmission processing unit 109, and a system information storage unit 111. FIG. 18 illustrates only main functional units of the base station 100, and the functional configuration illustrated in FIG. 18 is merely an example. Functional division and names of the functions may be any functional division and names are not limited to the example, provided that the operation according to the embodiment can be executed.

The signal transmission unit 101 includes a function to generate various types of signals in the physical layer from signals in a higher layer to be transmitted from the base station 100 and wirelessly transmit the generated signals. The signal reception unit 103 includes a function to wirelessly receive various signals from the user equipment 200 and obtain signals in a higher layer from the received signals in the physical layer.

It is assumed that each of the signal transmission unit 101 and the signal reception unit 103 performs processing in a layer 1 (PHY), a layer 2 (MAC, RLC and PDCP), and a layer 3 (RRC). However, the functional configurations of the signal transmission unit 101 and the signal reception unit 103 are not limited thereto.

The system information storage unit 111 stores system information to be provided to the user equipment 200.

The SS/PBCH transmission processing unit 105 generates synchronization signals (PSS and SSS) and obtains system information (MIB) which is stored in the system information storage unit 111 and is to be transmitted on a PBCH. The SS/PBCH transmission processing unit 105 causes the signal transmission unit 101 to transmit the synchronization signals and the MIB.

The PDCCH transmission processing unit 107 generates control information which is necessary to receive a PDSCH and is to be transmitted on a PDCCH. The PDCCH transmission processing unit 107 causes the signal transmission unit 101 to transmit the control information.

The PDSCH transmission processing unit 109 obtains system information (RMSI) which is stored in the system information storage unit 111 and is to be transmitted on the PDSCH. The PDSCH transmission processing unit 109 causes the signal transmission unit 101 to transmit the RMSI.

Figure 19:
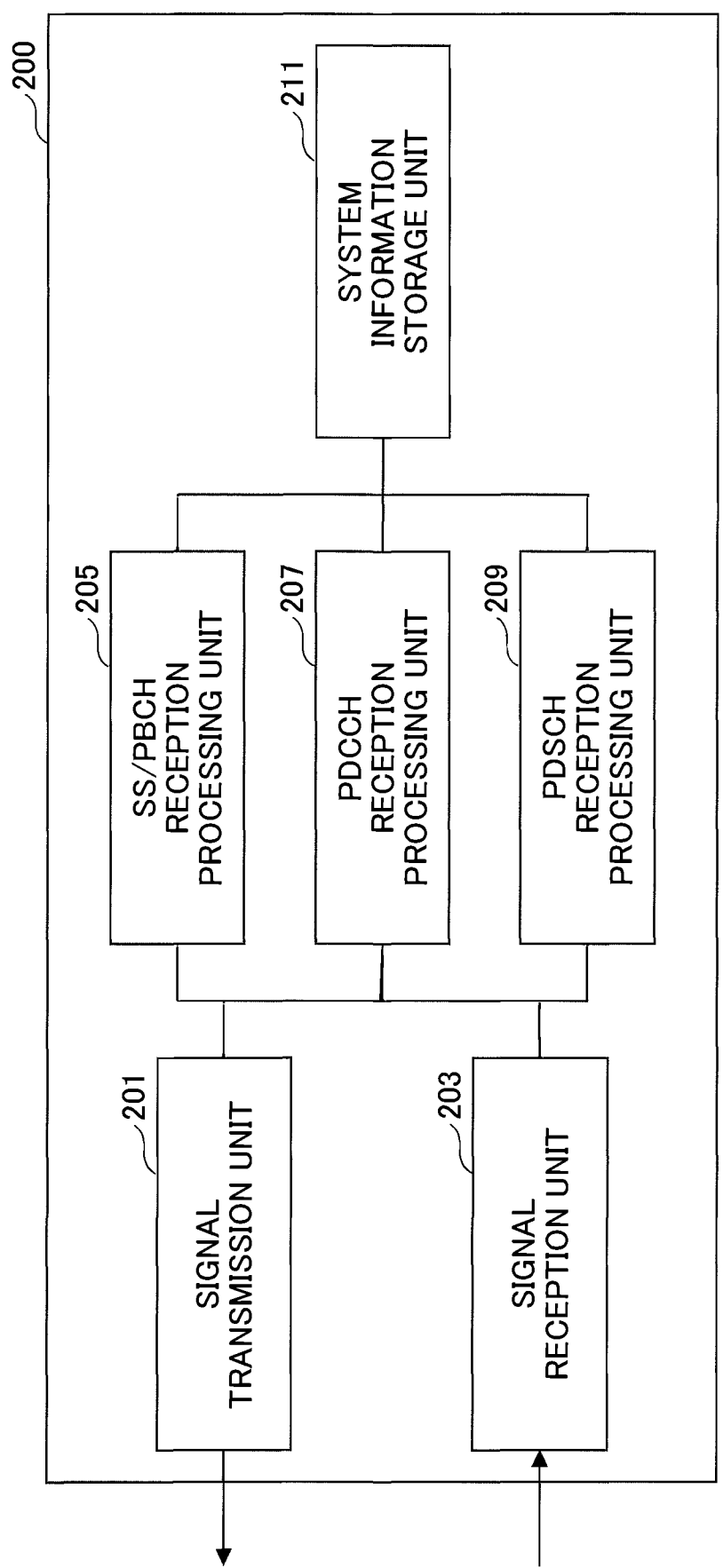
FIG. 19 is a diagram illustrating an example of a functional configuration of user equipment according to an embodiment of the present invention.
Figure 20:
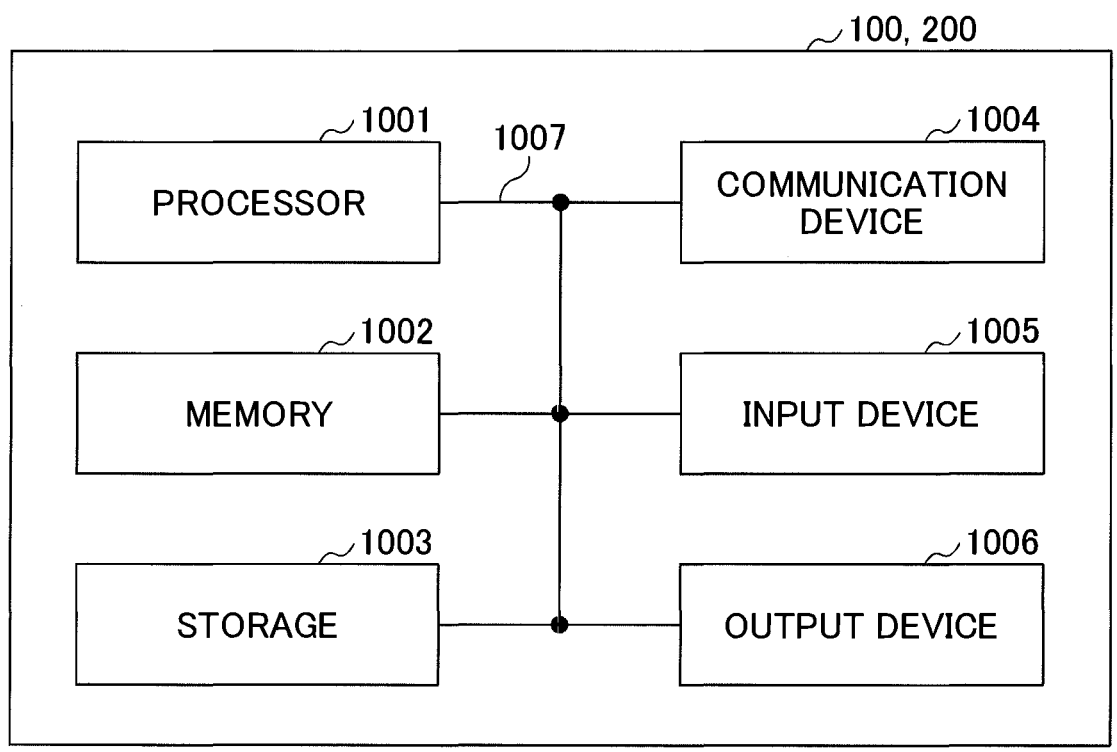
FIG. 20 is a diagram illustrating an example of a hardware configuration of a base station or user equipment.

FIG. 19 is a diagram illustrating an example of a functional configuration of the user equipment 200 according to an embodiment of the present invention. As illustrated in FIG. 19, the user equipment 200 includes a signal transmission unit 201, a signal reception unit 203, an SS/PBCH reception processing unit 205, a PDCCH reception processing unit 207, a PDSCH reception processing unit 209, and a system information storage unit 211. FIG. 19 illustrates only main functional units of the user equipment 200 particularly related to the embodiment of the present invention, and the functional configuration illustrated in FIG. 19 is merely an example. Functional division and names of the functions may be any functional division and names are not limited to the example, provided that the operation according to the embodiment can be executed.

The signal transmission unit 201 includes a function to generate various types of signals in the physical layer from signals in a higher layer to be transmitted from the user equipment 200 and wirelessly transmit the generated signals. The signal reception unit 203 includes a function to wirelessly receive various signals from the base station 100 and obtain signals in a higher layer from the received signals in the physical layer.

It is assumed that each of the signal transmission unit 201 and the signal reception unit 203 performs processing in a layer 1 (PHY), a layer (MAC, RLC and PDCP), and a layer 3 (RRC). However, the functional configurations of the signal transmission unit 201 and the signal reception unit 203 are not limited thereto.

The system information storage unit 211 stores system information provided by the base station 100.

The SS/PBCH reception processing unit 205 detects a cell frequency, a reception timing, and a cell ID from synchronization signals (PSS and SSS) received by the signal reception unit 203. Further, the SS/PBCH reception processing unit 205 obtains system information (MIB) transmitted on the PBCH, as described in step S101 in FIG. 2, and stores the MIB in the system information storage unit 211.

The PDCCH reception processing unit 207 determines a PDCCH search space, as described in step S103 in FIG. 2. The PDCCH reception processing unit 207 finds the PDCCH search space and obtains control information transmitted on the PDCCH, as described in step S105 in FIG. 2.

The PDSCH reception processing unit 209 obtains system information (RMSI) transmitted on the PDSCH using the control information obtained by the PDCCH reception processing unit 207, as described in step S105 in FIG. 2, and stores the RMSI in the system information storage unit 211.

<Hardware Configuration>

The block diagrams (FIG. 18 and FIG. 19) used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

For example, the base station 100 and the user equipment 200 according to the embodiment of the invention may function as a computer that performs the processes according to this embodiment. FIG. 14 is a diagram illustrating an example of a hardware configuration of the base station 100 or the user equipment 200 according to this embodiment. Each of the base station 100 and the user equipment 200 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 100 or the user equipment 200 may include one or a plurality of devices illustrated with 1001-1006 in FIG. 8 or may not include some of the devices.

Each function of the base station 100 and the user equipment 200 may be implemented by the following process: predetermined software (program) is read onto hardware such as the processor 1001 or the memory 1002, and the processor 1001 performs an operation to control the communication of the communication device 1004, and/or the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the SS/PBCH transmission processing unit 105, the PDCCH transmission processing unit 107, and the PDSCH transmission processing unit 109 in the base station 100 may be implemented by a control program that is stored in the memory 1002 and is executed by the processor 1001. Similarly, the SS/PBCH reception processing unit 205, the PDCCH reception processing unit 207, and the PDSCH reception processing unit 209 in the user equipment 200 may be implemented by a control program that is stored in the memory 1002 and is executed by the processor 1001. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform the processes according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the signal transmission unit 101 and the signal reception unit 103 in the base station 100 may be implemented by the communication device 1004. Similarly, the signal transmission unit 201 and the signal reception unit 203 in the user equipment 200 may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and the memory 1002 are connected to each other via the bus 1007 for information communication. The bus 1007 may be a single bus or the devices may be connected to each other by different buses.

Each of the base station 100 and the user equipment 200 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

SUMMARY OF EMBODIMENTS

As described above, in an embodiment of the present invention, there is provision for user equipment including:

a reception unit configured to receive first system information transmitted from a base station in a frequency block where a synchronization signal is placed; and a control unit configured to determine, based on a parameter value determined from the first system information, whether a control channel search space for receiving second system information exists; when the control channel search space does not exist, cause the reception unit to receive third system information in another frequency block; determine, based on a parameter value determined from the third system information, whether the control channel search space for receiving the second system information exists; and when the control channel search space does not exist, assume that a synchronization signal to be detected does not exist in a frequency range that is at least part of a carrier frequency band until a predetermined condition is satisfied.

The control unit may stop detecting the synchronization signal in the frequency range until the predetermined condition is satisfied, and resume detection of the synchronization signal after the predetermined condition is satisfied.

The user equipment can properly determine a PDCCH search space. For example, even if a malicious attacker installs a fake base station to transmit an improper MIB, a time period during which detection of an SS/PBCH block is stopped is limited, and thus it is possible to avoid a situation where the user equipment cannot access a proper base station.

The control unit may assume that the synchronization signal to be detected does not exist in the frequency range until detection of a synchronization signal over frequencies other than the frequency range is completed.

The control unit may assume that the synchronization signal to be detected does not exist in the frequency range until a predetermined time period has elapsed.

Since the user equipment need only manage the time period using a timer, detection of a synchronization signal can be resumed with a simplified operation.

SUPPLEMENTARY EXPLANATION OF EMBODIMENTS

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

The present international application is based on and claims the benefit of priority of Japanese Patent Application No. 2018-079103 filed on Apr. 17, 2018, the entire contents of which are hereby incorporated by reference.

DESCRIPTION OF NOTATIONS

100 base station
101 signal transmission unit
103 signal reception unit
105 SS/PBCH transmission processing unit
107 PDCCH transmission processing unit
109 PDSCH transmission processing unit
111 system information storage unit
200 user equipment
201 signal transmission unit
203 signal reception unit
205 SS/PBCH reception processing unit
207 PDCCH reception processing unit
209 PDSCH reception processing unit
211 system information storage unit

The invention claimed is:

1. A terminal, comprising:
a receiver that receives first system information in a frequency block where a synchronization signal is placed and third system information in another frequency block; and
a processor that stops detecting the synchronization signal, (1) based on a parameter value determined from the first system information, (1-1) when a control channel search space for receiving second system information does not exist and (1-2) when the parameter value is within a certain range and (2) when the control channel search space for receiving the second system information does not exist based on a parameter value determined from the third system information.

2. The terminal as claimed in claim 1, wherein the processor assumes that a synchronization signal to be detected does not exist until detection of a synchronization signal in a frequency range that is at least part of a carrier frequency band is completed.

3. The terminal as claimed in claim 2, wherein the processor assumes that a synchronization signal to be detected does not exist in a frequency range that is at least part of a carrier frequency band until a certain condition is satisfied, (1) based on the parameter value determined from the first system information, (1-1) when the control channel search space for receiving the second system information does not exist and (1-3) when the parameter value is not within the certain range.

4. The terminal as claimed in claim 2, wherein the first system information is master information block (MIB), the second system information is system information transmitted on a shared channel, and the control channel search space is a physical downlink control channel (PDCCH) search space to be detected in common by terminals in a cell.

5. The terminal as claimed in claim 1, wherein the processor assumes that a synchronization signal to be detected does not exist in a frequency range that is at least part of a carrier frequency band until a certain condition is satisfied, (1) based on the parameter value determined from the first system information, (1-1) when the control channel search space for receiving the second system information does not exist and (1-3) when the parameter value is not within the certain range.

6. The terminal as claimed in claim 5, wherein the processor assumes that the synchronization signal to be detected does not exist in the frequency range until a certain time period has elapsed.

7. The terminal as claimed in claim 6, wherein the processor resumes detection of the synchronization signal in the frequency range after the certain condition is satisfied.

8. The terminal as claimed in claim 6, wherein the first system information is master information block (MIB), the second system information is system information transmitted on a shared channel, and the control channel search space is a physical downlink control channel (PDCCH) search space to be detected in common by terminals in a cell.

9. The terminal as claimed in claim 5, wherein the processor resumes detection of the synchronization signal in the frequency range after the certain condition is satisfied.

10. The terminal as claimed in claim 9, wherein the first system information is master information block (MIB), the second system information is system information transmitted on a shared channel, and the control channel search space is a physical downlink control channel (PDCCH) search space to be detected in common by terminals in a cell.

11. The terminal as claimed in claim 5, wherein the first system information is master information block (MIB), the second system information is system information transmitted on a shared channel, and the control channel search space is a physical downlink control channel (PDCCH) search space to be detected in common by terminals in a cell.

12. The terminal as claimed in claim 1, wherein the first system information is master information block (MIB), the second system information is system information transmitted on a shared channel, and the control channel search space is a physical downlink control channel (PDCCH) search space to be detected in common by terminals in a cell.

13. A synchronization signal detection method in a terminal, comprising:
receiving first system information in a frequency block where a synchronization signal is placed and third system information in another frequency block; and
stopping detecting the synchronization signal, (1) based on a parameter value determined from the first system information, (1-1) when a control channel search space for receiving second system information does not exist and (1-2) when the parameter value is within a certain range and (2) when the control channel search space for receiving the second system information does not exist based on a parameter value determined from the third system information.

* * * * *